May 17, 1927.
M. HÖLKEN, SR
1,629,077
PRODUCTION OF FODDER
Filed April 24, 1925
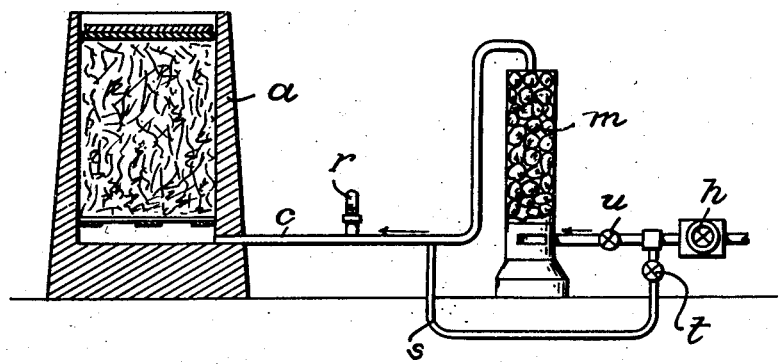
Inventor
Martin Hölken, Sr.
By
Attorney Patented May 17, 1927.

1,629,077

UNITED STATES PATENT OFFICE.

MARTIN HÖLKEN, SR., OF BARMEN, GERMANY.

PRODUCTION OF FODDER.

Application filed April 24, 1925, Serial No. 25,595, and in Germany February 17, 1925.

The subject matter of the invention is an improvement in or modification of the process, described and claimed in the U. S. Patent No. 1,526,147, granted to me on Feb. 10, 1925, for rendering green fodder durable by converting it into sweet pressed fodder, whereby the development of lactic acid bacteria is favourably influenced by introducing hot gases, which are conveniently derived from a coke furnace, into the mass of fodder. According to the aforesaid specification, the temperature of the gases to be introduced into the mass of fodder is regulated in a very simple manner by mixing the gases coming from the coke furnace, the temperature of which gases is generally more than 100° C., with as much atmospheric air as is necessary in order to obtain the temperature desired. The temperature desired in the fodder, namely about 40-60° C., is in this way quickly and economically obtained, and the formation of lactic acid is favoured.

Nevertheless, the formation of butyric acid or even acetic acid in the mass of fodder, whereby the nutritive value of the fodder is reduced, cannot always be avoided. The reason for this is attributed by the applicant to the fact that, owing to the admixture of air to the gases of combustion, considerable quantities of free oxygen, which favours the development of butyric and acetic acid bacteria, obtain access to the fodder.

According to the present invention, care is taken that only the smallest possible quantity of free oxygen reaches the mass of fodder, and that, during the heating process or, alternatively, after this process, only gases which contain no free oxygen or very small quantities thereof are introduced into the mass of fodder. Thus the process may advantageously be carried out in the following manner. During the heating process combustion gases and air are blown into the mass of fodder while, at the end of this process, the admixture of air is omitted and the combustion gases alone are introduced into the mass of fodder. The temperature of these gases, which, as is well-known, consist chiefly of carbon dioxide, carbonic oxide and nitrogen, must of course be reduced by any suitable means, and may be effected, for example, by introducing atmospheric air into the furnace and passing it through the glowing coke so slowly that, on the one hand, all its free oxygen is removed and, on the other hand, it is sufficiently cooled on its way to the mass of fodder, for which purpose a separate cooling device may also be provided if necessary. Owing to the slow passage of these gases, which now contain no free oxygen, through the mass of fodder, the gases which are still present in the latter are gradually pressed out upwardly and all free, i. e. harmful, oxygen is thereby removed.

A suitable device for carrying out the process is illustrated diagrammatically, by way of example, in the accompanying drawing.

In the drawing, $a$ is the container for the fodder, $m$ the coke furnace and $h$ the pump. The latter forces the air which is sucked in by it in the direction of the arrow through the furnace $m$ along the pipe $c$ and into the container $a$ from below. Beside the furnace $m$ there is provided a short-circuiting pipe $s$ having a valve $t$, through which a variable quantity of atmospheric air can be pumped into the pipe $c$ and thence into the container $a$ without passing through the furnace $m$. The quantity of air is so regulated, by means of the valve $t$ that the mixture to be blown into the container $a$ is at the correct temperature, which may be read on the thermometer $r$. When the whole of the fodder has been sufficiently warmed throughout, the valve $t$ is completely closed and the valve $u$ is simultaneously throttled down to such an extent that only a relatively small quantity of air reaches the furnace and this air is entirely freed from free oxygen, while, owing to the slow passage of the gas, overheating of the mass of fodder is not to be feared. In some cases however, separate means for cooling the combustion gases may be provided, or the cooling may be effected by blowing into the pipe $c$, in addition to the combustion gases, a further quantity of carbon dioxide, which is contained for example in a vessel under pressure, in which case, owing to the expansion of the gas, the cooling effect is very considerable.

In all these cases owing to the slow percolation of the gases, the oxygen which is still present in the mass of fodder is forced out upwardly and a condition, which is particularly favourable to the preservation of the fodder, is thereby attained.

The invention is, of course, not limited to the example illustrated, as various modifications are possible, in particular other neutral gases might be employed for removing the atmospheric oxygen from the mass of fodder.

Claims—

1. The described method of preserving green fodder in silos by conversion into sweet pressed fodder, which consists in initially forcing into the packed silage gases containing atmospheric air having its normal free oxygen content, and in subsequently forcing in gases practically devoid of free oxygen, and using these latter gases to drive out of the silage the more or less oxygen-laden gases.

2. The described method of preserving green fodder in silos by conversion into pressed sweet fodder, which consists in forcing into the silage combustion gases tempered by fresh air until the mass is relatively quickly heated to the desired conversion temperature, then stopping the supply of fresh air and reducing the flow of the combustion gases and employing the latter during the final stage of the treatment for forcing out of the silage the still present oxygen.

3. The described method of preserving green fodder in silos by conversion into pressed sweet fodder, which consists in forcing into the silage coke combustion gases tempered by fresh air for relatively quickly heating the mass to the optimum fermentation temperature, then stopping the supply of fresh air, cooling the combustion gases and reducing the flow thereof into the mass, and using the combustion gases for removing the still present oxygen from the silage.

4. The described method of preserving green fodder in silos by conversion into pressed sweet fodder, which consists in forcing into the silage a mixture of heated gases and fresh air to relatively quickly heat the mass to effective fermentation temperatures, discontinuing the admixture of fresh air to the heated gases, continuing but reducing the flow of the now practically oxygen-free heated gases and introducing into the latter a temperature controlling medium.

5. The described method of preserving green fodder in silos by conversion into pressed sweet fodder, which consists in forcing into the silage a mixture of coke combustion gases and fresh air to heat the mass to effective fermentation temperatures, discontinuing the admixture of fresh air to the combustion gases, continuing but reducing the flow of the now practically oxygen-free combustion gases, and introducing into the latter carbon dioxide under pressure for temperature controlling purposes.

In testimony whereof I affix my signature.

MARTIN HÖLKEN, Sen.